US012726250B2

(12) United States Patent
Shibaike et al.

(10) Patent No.: US 12,726,250 B2
(45) Date of Patent: Sep. 1, 2026

(54) TERMINAL, BASE STATION AND COMMUNICATION METHOD

(71) Applicant: NTT DOCOMO, INC., Tokyo (JP)

(72) Inventors: Naoya Shibaike, Tokyo (JP); Hiroki Harada, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 308 days.

(21) Appl. No.: 18/576,648

(22) PCT Filed: Aug. 5, 2021

(86) PCT No.: PCT/JP2021/029188
§ 371 (c)(1),
(2) Date: Jan. 4, 2024

(87) PCT Pub. No.: WO2023/012984
PCT Pub. Date: Feb. 9, 2023

(65) Prior Publication Data

US 2024/0333364 A1 Oct. 3, 2024

(51) Int. Cl.
*H04B 7/06* (2006.01)
*H04L 5/00* (2006.01)

(52) U.S. Cl.
CPC ......... *H04B 7/0695* (2013.01); *H04L 5/0094* (2013.01)

(58) Field of Classification Search
CPC ............................ H04B 7/0695; H04L 5/0094
USPC .......................................................... 370/329
See application file for complete search history.

(56) References Cited

U.S. PATENT DOCUMENTS

2021/0021330 A1* 1/2021 Khoshnevisan ..... H04B 7/0617
2021/0112540 A1* 4/2021 Zewail .................. H04W 72/23

OTHER PUBLICATIONS

3GPP TSG RAN WG1 #104b-e; R1-2103912 “Discussion Summary #2 for Beam Management for new SCSs” Moderator (InterDigital, Inc.); e-Meeting, Apr. 12-20, 2021 (62 pages).
3GPP TSG RAN WG1 #104b-e; R1-2102839 “Enhancements on Multi-TRP for PDCCH, PUCCH and PUSCH” Lenovo, Motorola Mobility; e-Meeting, Apr. 12-20, 2021 (17 pages).
3GPP TSG RAN WG1 #104-bis-e; R1-2102999 “Beam-management enhancements for NR from 52.6 GHz to 71GHz” Lenovo, Motorola Mobility; e-meeting, Apr. 12-20, 2021 (8 pages).
3GPP TS 38.300 V16.6.0 “3rd Generation Partnership Project; Technical Specification Group Radio Access Network; NR; NR and NG-RAN Overall Description; Stage 2 (Release 16)” Jun. 2021 (152 pages).
3GPP TS 38.306 V16.5.0 “3rd Generation Partnership Project; Technical Specification Group Radio Access Network; NR; User Equipment (UE) radio access capabilities (Release 16)” Jun. 2021 (153 pages).
International Search Report issued in International Application No. PCT/JP2021/029188, mailed Mar. 22, 2022 (7 pages).
Written Opinion issued in International Application No. PCT/JP2021/029188; Dated Mar. 22, 2022 (4 pages).

* cited by examiner

*Primary Examiner* — Christopher R Crompton
(74) *Attorney, Agent, or Firm* — Osha Bergman Watanabe & Burton LLP

(57) ABSTRACT

A terminal includes: a control unit configured to assume a beam switching gap between a plurality of signals or channels for transmission or reception to be a sufficient time corresponding to a larger subcarrier spacing.

3 Claims, 6 Drawing Sheets

FIG.3

| SCS | 15 kHz | 30 kHz | 60 kHz | 120 kHz | 240 kHz | 480 kHz | 960 kHz |
|---|---|---|---|---|---|---|---|
| Symbol duration | 66.6 us | 33.3 us | 16.55 us | 8.325 us | 4.1625 us | 2.08125 us | 1.040625 us |

TERMINAL, BASE STATION AND COMMUNICATION METHOD

FIELD OF THE INVENTION

The present invention relates to a terminal, a base station, and a communication method in a wireless communication system.

BACKGROUND OF THE INVENTION

Regarding NR (New Radio) (also referred to as "5G"), or a successor system to LTE (Long Term Evolution), technologies have been discussed which satisfy the following requirements: a high capacity system, high data transmission rate, low delay, simultaneous connection of multiple terminals, low cost, power saving, etc. (for example. Non-Patent Document 1).

NR release 17 discusses using a higher frequency band than a conventional release (e.g., Non-Patent Document 2). For example, applicable numerologies including subcarrier spacings, channel bandwidths, etc., physical layer design, and possible failures in actual wireless communication in the 52.6 GHz to 71 Hz frequency band have been discussed.

CITATION LIST

Non-Patent Document

Non-Patent Document 1: 3GPP TS 38.300 V16.6.0 (2021-06)

Non-Patent Document 2: 3GPP TS 38.306 V16.5.0 (2021-06)

SUMMARY OF THE INVENTION

Technical Problem

In the conventional frequency band, because the beam switching gap between signals or channels is small, the scheduling strategy and the cyclic prefix (CP) period are considered to be sufficient for avoiding an issue related to the beam switching.

However, in a frequency band in which a newly operated frequency higher than the conventional frequency is used, a larger subcarrier spacing (SCS) is used, and a greater number of beams are expected to be used. With respect to the larger subcarrier spacing as described above, there is an issue that the length of the cyclic prefix (CP) is not sufficient for covering the time required for the beam switching.

The present invention has been made in view of the above, and it is an object of the present invention to provide a technique that enables to ensure the time required for the beam switching.

Solution to Problem

According to the disclosed technology, a terminal is provided. The terminal includes: a control unit configured to assume a beam switching gap between a plurality of signals or channels for transmission or reception to be a sufficient time corresponding to a larger subcarrier spacing.

Advantageous Effects of Invention

According to the disclosed technique, a technique for enabling the flexible beam switching to support the larger subcarrier spacing is provided.

BRIEF DESCRIPTION OF THE DRAWINGS

FIG. 3 is a drawing illustrating relationship between SCSs and symbol lengths.

DETAILED DESCRIPTION OF THE PREFERRED EMBODIMENTS

Figure 1:
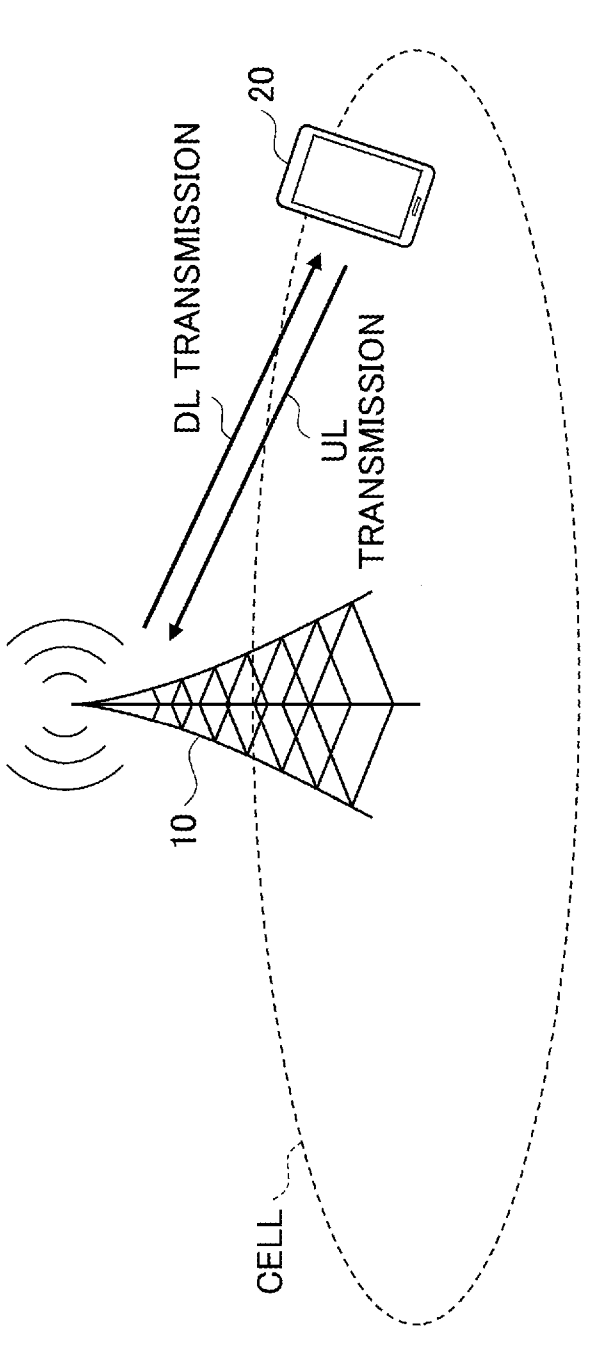
FIG. 1 is a drawing illustrating a wireless communication system related to an embodiment of the present invention.

In the following, referring to the drawings, one or more embodiments of the present invention will be described. It should be noted that the embodiments described below are examples. Embodiments of the present invention are not limited to the following embodiments.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, a conventional technique will be used appropriately. Although the conventional technique is related to the existing NR, the conventional technique is not limited to the existing NR.

In addition, in this specification, terms used in the technical specifications of the existing NR or LTE, such as PDCCH, RRC, MAC, DCI, etc., are used. However, the channel names, protocol names, signal names, functional names, or the like, used in this specification may be referred to as different names.

(System configuration)

FIG. 1 is a drawing illustrating a wireless communication system related to an embodiment of the present invention. As illustrated in FIG. 1, the wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communications with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. Further, a TTI (Transmission Time Interval) in the time domain may be a slot, or the TTI may be a subframe.

The base station 10 transmits a synchronization signal and system information to the terminal 20. The synchronization signal is, for example, an NR-PSS and an NR-SSS. The system information is transmitted via, for example, a NR-PBCH, and may be referred to as broadcast information. The synchronization signal and the system information may be referred to as an SSB (SS/PBCH block). As shown in FIG. 1, the base station 10 transmits a control signal or data in DL (Downlink) to the terminal 20 and receives a control signal or data in UL (Uplink) from the terminal 20. The base station 10 and terminal 20 are capable of transmitting and receiving a signal by performing the beamforming. Further, the base station 10 and the terminal 20 can both apply MIMO (Multiple Input Multiple Output) communication to DL or UL. Further, the base station 10 and the terminal 20 may both perform communications via a secondary cell (SCell: Secondary Cell) and a primary cell (PCell: Primary Cell) using CA (Carrier Aggregation). In addition, the terminal 20 may perform communications via a primary cell of the base station 10 and a primary secondary cell group cell (PSCell: Primary SCG Cell) of another base station 10 using DC (Dual Connectivity).

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. In addition, the terminal 20 receives various reference signals transmitted from the base station 10 and performs measurement of the propagation path quality based on the reception result of the reference signals. Note that the terminal 20 may be referred to as a UE, and the base station 10 may be referred to as a gNB.

Figure 2:
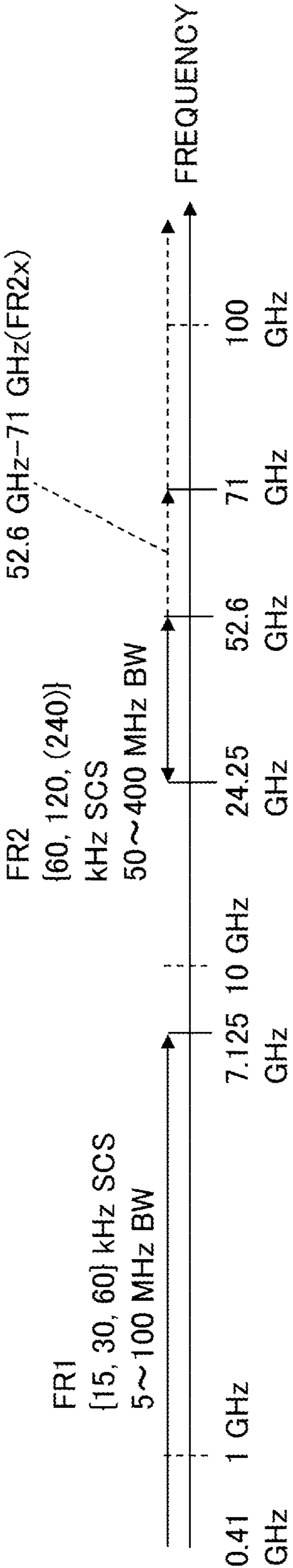
FIG. 2 is a drawing illustrating an example of a frequency range according to an embodiment of the present invention.

FIG. 2 is a drawing illustrating an example of a frequency range according to an embodiment of the present invention. In the NR specifications of 3GPP Release 15 and Release 16, for example, an operation in a frequency band of 52, 6 GHz or more has been discussed. Note that, as shown in FIG. 2, FR (Frequency range) 1 in which current operation is defined is a frequency band from 410 MHz to 7. 125 GHz, SCS (Sub carrier spacing) is 15, 30, or 60 kHz. and bandwidth is from 5 MHz to 100 MHz. FR2 is a frequency band from 24, 25 GHz to 52, 6 GHz, SCS is 60, 120, or 240 kHz, and bandwidth is from 50 MHz to 400 MHz. For example, the newly operated frequency band may be assumed to be from 52, 6 GHz to 71 GHz.

Up to 64 SSB beams may be supported in the licensed bands and unlicensed bands in the newly deployed frequency band. Also, 120 kHz SCS to be applied to SSB and 120 kHz SCS to be applied to initial access signals and channels, may be supported in the initial BWP (Bandwidth Part).

In addition to the 120 kHz SCS, SSB with 480 kHz SCS may be supported. Initial access supporting CORESET (Control Resource Set) #0/Type0-PDCCH included in the MIB, may be performed by the SSB. However, there may be the following limitations. For example, entry numbers of the synchronization raster may be limited. In addition, only CORESET #0/Type0-PDCCH with 480 kHz SCS may be supported in a case of SSB with 480 kHz SCS. Furthermore. SSB-CORESET multiplexing pattern 1 (SS/PBCH block and CORESET multiplexing pattern 1) may be prioritized.

Uniquely identifying the ANR (Automatic Neighbour Relation) and PCI (Physical Cell Identity) for detecting SSB with 120 kHz SCS, 480 kHz SCS, and 960 kHz SCS may be supported. In addition. CORESET #0/Type0-PDCCH included in MIB of SSB with 120 kHz SCS, 480 kHz SCS, and 960 kHz SCS, may be supported. In addition, one SCS for CORESET #0/Type0-PDCCH may be supported per SCS for SSB. For example, with respect to {SCS of SSB. SCS of CORESET #0/Type0-PDCCH}. {120,120}, {480, 480}, and {960,960} may be supported. Furthermore, the SSB-CORESET multiplexing pattern 1 may be prioritized.

Note that an enhancement related to SSB is performed in release 16 NR-U. For example, up to 20 SSB candidate positions may be configured in the up to 5 ms DBTW (Discovery burst transmission window) in a case of 30 kHz SCS, and up to 10 SSB candidate positions may be configured in a case of 15 kHz SCS. In addition, in an SSB candidate position corresponding to PBCH-DMRS in each DBTW, one of up to 8 beams applied to the SSB may be transmitted. In addition, the PBCH payload may indicate MSBs of an SSB candidate position index and QCL (Quasi co-location) parameters. Note that the number of QCL parameters applied to the SSB may be {1, 2, 4, 8}.

FIG. 3 is a drawing illustrating relationships between SCSs and symbol lengths (symbol durations). As shown in FIG. 3, the symbol length (symbol duration) becomes shorter as the SCS becomes wider. In addition, if it is assumed that the number of symbols per slot is constant (i.e., 14 symbols), the slot length becomes shorter as the SCS becomes wider.

With respect to the larger subcarrier spacing as described above, there is an issue that the length of the cyclic prefix (CP) is not sufficient for covering the time required for the beam switching.

Hereinafter, a technique for the terminal 20 and the base station 10 for enabling the flexible beam switching to support the larger subcarrier spacing will be described.

OVERVIEW OF EMBODIMENT

In order to cope with the conventional technical issue as described above, in an embodiment of the present invention, the beam switching gap between the plurality of signals or channels is assumed to be a time sufficient for supporting the larger subcarrier spacing. Hereinafter, an embodiment 1 and an embodiment 2 illustrating specific methods will be described.

Embodiment 1

In this embodiment, an example will be described in which the beam switching gap between signals or channels is defined as a "transient period" based on the requirements of the wireless devices.

The transient period of the transmissions or receptions is specified according to a specific condition.

<Option 1>

The "transmissions or receptions" may mean at least one of the following transmissions or receptions. In other words, the "transitions and receptions" may mean a plurality of SRSs (Sounding Reference Signals), a plurality of PUCCHs (Physical Uplink Control Channels), a plurality of PUSCHs (Physical Uplink Shared Channels), a plurality of DMRSs (Demodulation reference signals), a plurality of PTRSs (Phase-tracking reference signals), a plurality of PDCCHs (Physical Downlink Control Channels), a plurality of PDSCHs (Physical Downlink Shared Channels), a plurality of CSI-RSs (Channel-state information reference signals), a plurality of SSBs, a plurality of RACHs (Random Access Channels), or a combination thereof.

<Option 2>

The "specific condition" may mean at least one of the following conditions. A first condition is a condition of using individual transmission beams. A second condition is a condition of using individual spatial filters. A third condition is a condition of using individual QCLs or TCI configurations. A fourth condition is a condition of using individual transmission powers.

<Option 3>

The length of the "transient period" may be at least one of the following periods. The length of a first transient period is a fixed value. For example, the length may be 5 microseconds, 4 microseconds, or 3 microseconds. Note that the unit is not required to be a microsecond.

The length of a second transient period is a value determined according to a condition. For example, the length is a value determined according to a subcarrier spacing as a condition, and is 5 microseconds in a case of 120 kHz subcarrier spacing and is 3 microseconds in a case of 960 kHz subcarrier spacing. In addition, for example, the length may be a value determined according to the subcarrier spacing and the capability or feature of the terminal 20 as a condition.

The length of a third transient period may be a configurable value. For example, the length may be a value configured by RRC, MAC-CE, DCI, etc.

Effects of Embodiment 1

According to a wireless communication system related to an embodiment of the present invention, the "transient period" is defined as a sufficient time for supporting the larger subcarrier spacing. According to the above, it is possible to ensure a sufficient period between a plurality of transmissions or receptions without requiring configurations or indications.

Embodiment 2

In this embodiment, an example will be described in which the beam switching gap between signals or channels is defined based on the design of the physical layer.

Embodiment 2-1

The terminal 20 does not assume signals or channels of individual beams for transmission or reception are to be scheduled or configured. In other words, the gap between signals or channels of the individual beams is smaller than the required beam switching gap.

In this case, an error case may be specified in a case where the beam switching gap is unexpectedly large, and, for example, the terminal 20 may retransmit a signal after the beam is switched.

Embodiment 2-2

The terminal 20 assumes signals or channels of individual beams for transmission or reception are to be scheduled or configured. In other words, the gap between signals or channels of the individual beams is larger than the required beam switching gap.

Specifically, a process of the terminal 20 for a case in which there is no sufficient beam switching gap between a plurality of signals or channels may be specified.

Figure 4:
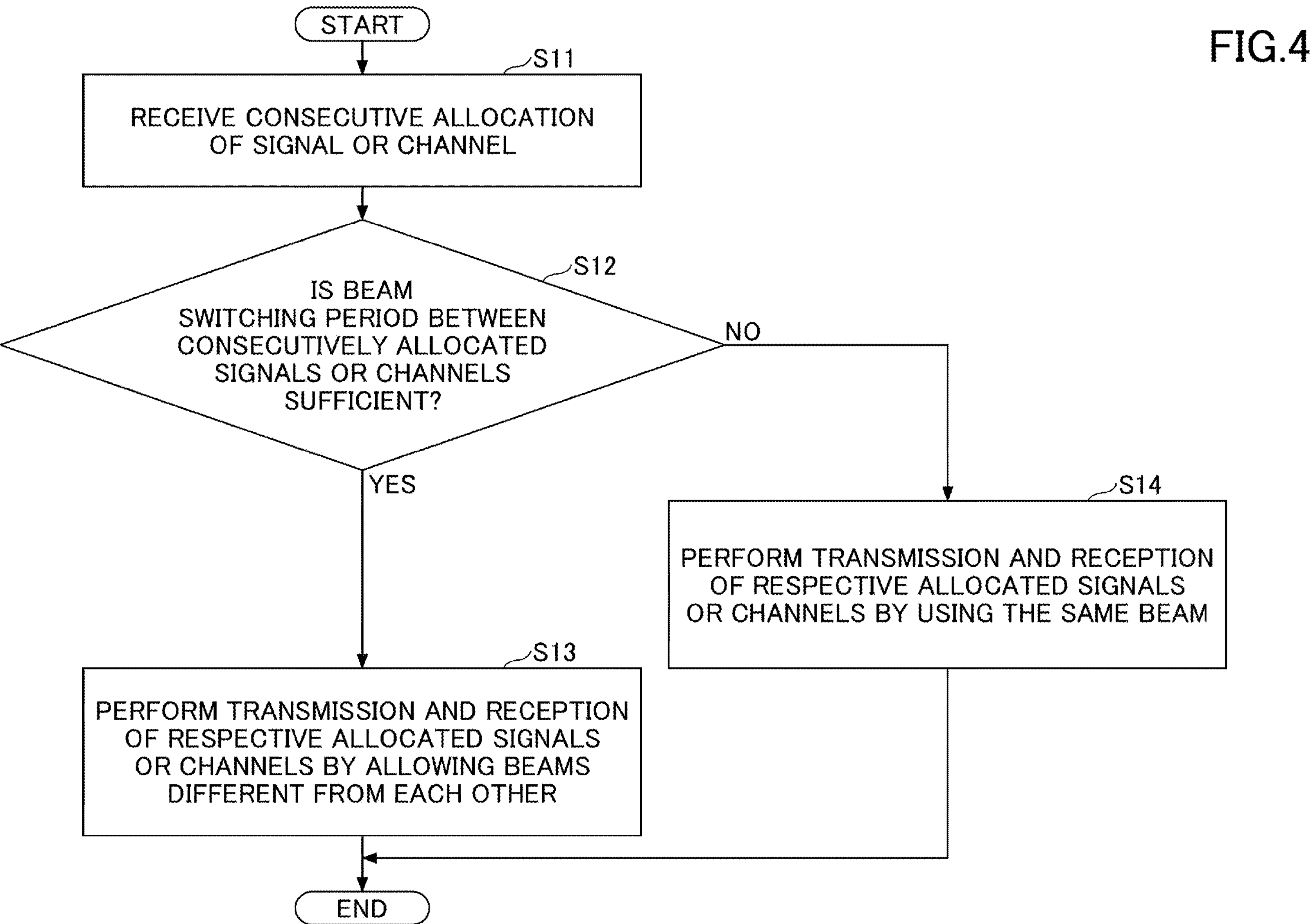
FIG. 4 is a flowchart illustrating an example of a flow of transmission or reception of allocated signals or channels related to a second embodiment of the present invention.

FIG. 4 is a flowchart illustrating an example of a flow of transmission or reception of allocated signals or channels related to a second embodiment of the present invention.

The base station 10 or the terminal 20 receives consecutive allocation of signals or channels according to DCI, or the like (step S11). Subsequently, the base station 10 or the terminal 20 determines whether the beam switching gap between the consecutively allocated signals or channels is sufficient (step S12).

The base station 10 or the terminal 20 transmits or receives respective allocated signals or channels by allowing beams different from each other (step S13) in a case where the beam switching gap between the consecutively allocated signals or channels is determined to be sufficient (step S12: YES).

The base station 10 or the terminal 20 transmits or receives respective allocated signals or channels using the same beam (step S14) in a case where the beam switching gap between the consecutively allocated signals or channels is determined to be insufficient (step S12: NO).

In step S12 illustrated in FIG. 4, the base station 10 or the terminal 20 may perform determination based on at least one of the threshold values described below. In other words, the determination may be performed based on the "transient period" in an embodiment 1, a fixed value defined in advance, a plurality of fixed values specified by some conditions (for example, some conditions may include a subcarrier spacing, a frequency band, or the like).

In addition, the value with which the base station 10 or the terminal 20 compares the above-described threshold values may be one of the following values, in other words, the value may be the subcarrier spacing, the length of the cyclic prefix in the configured subcarrier spacing, or the symbol length.

In addition, the base station 10 or the terminal 20 may perform the determination of sufficiency in step S12 in a manner as described below.

For example, the base station 10 or the terminal 20 may assume that one symbol gap is needed between transmissions or receptions in a case where the length of the cyclic prefix in the configured subcarrier spacing is determined to be less than the above-described threshold value.

In addition, for example, the base station 10 or the terminal 20 may assume that one symbol gap is needed between transmissions or receptions in a case where the symbol length in the configured subcarrier spacing is determined to be less than the above-described threshold value.

In addition, with respect to an operation in step S14 illustrated in FIG. 4, the base station 10 or the terminal 20 may perform an operation described below.

Modified Embodiment 1

The base station 10 or the terminal 20 may transmit or receive these signals or channels by using the same beam without performing the beam switching. With respect to the beam determination method, one of the following methods may be used.

Modified Embodiment 1-1

The base station 10 or the terminal 20 may determine a beam for one of the following signals or channels.

Modified Embodiment 1-1a

The base station 10 or the terminal 20 may use a beam that is used for the preceding signal or channel. In this case, there is an advantage that the timeline is not required. In other words, the above-described operation can be performed in a case where the base station 10 or the terminal 20 is not aware of an issue of "insufficient beam switching gap" when starting the transmission or reception of the preceding signal or channel.

Modified Embodiment 1-1b

The base station 10 or the terminal 20 may use a beam that is used for the subsequent signal or channel. In this case, there is an advantage that using a beam used for transmission or reception of the subsequent signal or channel might be a more desired beam.

Modified Embodiment 1-1c

The base station 10 or the terminal 20 may use a beam that is specified by the last DCI among DCIs corresponding to the allocated signals or channels. This option can be applied only in a case where there is at, least one DCI corresponding to the allocated signals or channels. In this case, there is an advantage that the beam specified by the last DCI might be a more desirable beam.

Modified Embodiment 1-1d

The base station 10 or the terminal 20 may use a beam of a signal or channel with higher priority. Here, the base station 10 or the terminal 20 may determine the priority based on one of or both of the type of the signal or channel and the specified priority. The priority may be specified by a priority field of DCI. In this case, there is an advantage that the priority of the signal or channel can be considered.

Modified Embodiment 1-2

The base station 10 or the terminal 20 may use a beam that is configured by RRC or is specified in advance. For example, the beam that is specified in advance may be a wider beam that "covers" various beams.

A common beam that is specified in advance may be configured by RRC with respect to all of or different combinations of "before-and-after beam pairs". Alternatively, individual beams specified in advance may be individually configured by RRC with respect to the individual combinations of "before-and-after beam pairs".

The above-described configuration by RRC may follow or is not required to follow the beam relationship configured for the wider beam detection LBT (Listen Before Talk) for initiating the COT (Channel Occupancy Time) with a plurality of beams.

In this case, there is an advantage that the applied beam can cover a plurality of original beams.

Modified Embodiment 2

Instead of performing an operation in step S14 illustrated in FIG. 4, the base station 10 or the terminal 20 may refrain from performing the beam switching and may cancel the before-or-after transmission or reception. Here, the base station 10 or the terminal 20 may determine which of before or after transmission or reception to be canceled based on one of the following methods.

Modified Embodiment 2-1

The base station 10 or the terminal 20 may determine which of before or after transmission or reception to be canceled based on one of or both of the technical specification and the RRC configuration. For example, the preceding transmission or reception may be specified to be canceled, or the subsequent transmission or reception may be specified to be canceled.

Modified Embodiment 2-2

The base station 10 or the terminal 20 may determine which of before or after transmission or reception to be canceled based on one of or both of the type of signals or channels and the priority of signals or channels.

For example, in a case where the gap between the preceding higher-priority PUSCH and the subsequent lower-priority PUSCH is smaller than the required beam switching gap, the base station 10 or the terminal 20 may cancel the subsequent lower-priority PUSCH.

In addition, in a case where the gap between the preceding PUSCH and the subsequent PUCCH is smaller than the required beam switching gap, the base station 10 or the terminal 20 may cancel the preceding PUSCH.

Modified Embodiment 3

The base station 10 or the terminal 20 may perform the beam switching and reserve the gap by performing the puncturing or canceling of a specific symbol of the on signals or channels.

The base station 10 or the terminal 20 may determine one of the following symbols to be punctured or canceled.

Modified Embodiment 3-1

The base station 10 or the terminal 20 may determine the last symbol in the preceding transmission or reception to be a symbol to be punctured or canceled.

Modified Embodiment 3-2

The base station 10 or the terminal 20 may determine the first symbol in the subsequent transmission or reception to be a symbol to be punctured or canceled.

Modified Embodiment 3-3

The base station 10 or the terminal 20 may determine the last symbol in the preceding transmission or reception and the first symbol in the subsequent transmission or reception to be symbols to be punctured or canceled in a case where a plurality of symbols are required to be punctured or canceled.

Note that, in a case where the base station 10 or the terminal 20 is required to puncture or cancel three or more symbols, the number of symbols in each transmission or reception to be punctured or canceled may be determined based on one of or both of the technical specification and the RRC configuration.

The base station 10 or the terminal 20 may adopt the above-described symbol determination method, based on one of the following methods.

<Option 1>

The base station 10 or the terminal 20 may perform determination, based on one of or both of the technical specification and the RRC configuration.

<Option 2>

The base station 10 or the terminal 20 may perform determination, based on one of or both of the type of signals or channels and the specified priority. For example, in a case where the base station 10 or the terminal 20 determines that the priority of the preceding transmission or reception is high based on one of or both of the type of signals or channels and the specified priority, the base station 10 or the terminal 20 may adopt the modified embodiment 3-2 and determine the first symbol of the subsequent transmission or reception as a symbol to be punctured or canceled, and otherwise, the base station 10 or the terminal 20 may adopt the modified embodiment 3-1 and determine the last symbol of the preceding transmission or reception to be a symbol to be punctured or canceled.

Other Examples

Hereinafter, examples that can be applied to any of the embodiment. 1 or the embodiment 2 will be described.

The base station 10 or the terminal 20 may apply the above-described multiple methods to the beam switching between downlink signals or channels, or to the beam switching between the uplink signals or channels.

The base station 10 or the terminal 20 may apply the embodiment 1, the embodiment 2-1, and, the modified embodiment 2 and the modified embodiment 3 of the embodiment 2-2 to the beam switching between the downlink signals or channels and the uplink signals or channels.

The base station 10 or the terminal 20 may apply each of the above-described choices to a specific frequency range, for example, to NR 52.6-71 GHz.

The base station 10 or the terminal 20 may perform application of each of the above-described choices depending on a specific condition, for example, LBT enabled or disabled, licensed system or unlicensed system, etc.

The base station 10 or the terminal 20 may perform application of each of the above-described choices in a case of a specific numerology, for example, in a case of the subcarrier spacing being 480 kHz or 960 kHz, or in a case of the subcarrier spacing being 480 kHz and 960 kHz.

The base station 10 or the terminal 20 may determine which of the choices is to be applied based on at least one of the following methods.

- Configuration by an upper layer parameter
- Terminal capability reported by the terminal 20 (UE Capability) (a case for the base station 10)
- Specification of the technical specification
- The configuration by an upper layer parameter and the terminal capability reported by the terminal 20 (UE Capability) (a combination of the above-described determination methods) (a case for the base station 10)
- Determination according to signals or channels Information indicating whether the terminal 20 supports the beam switching interval defined in RANI may be defined as terminal capability (UE Capability).

In addition, as the terminal capability (UE Capability), information may be defined indicating whether the terminal 20 supports signals or channels that are configured or scheduled for individual beams, and indicating whether the terminal 20 supports each gap being smaller than the required beam switching gap.

In addition, as the terminal capability (UE Capability), information may be defined indicating whether the terminal 20 supports applying the same beam to signals or channels that have individually indicated or configured beams in a case where the gap between signals or channels is smaller than the required beam switching gap with respect to the terminal 20.

In addition, as the terminal capability (UE Capability), information may be defined indicating whether the terminal 20 supports canceling one of signals or channels that have individually indicated or configured beams in a case where the gap between signals or channels is smaller than the required beam switching gap with respect to the terminal 20.

The terminal 20 may transmit one or more of the above-described capability information items to the base station 10. Further, the base station 10 may indicate to the terminal 20 to perform an operation according to the capability, based on the capability information received from the terminal 20.

(Effects of a Wireless Communication System Related to an Embodiment of the Present Invention)

In the wireless communication system related to an embodiment of the present invention, the beam switching gap between a plurality of signals or channels is assumed to be a sufficient time corresponding to a larger subcarrier spacing.

For example, with respect to the terminal 20, the beam switching gap between signals or channels is defined as a “transient period” based on the requirements of the wireless devices. Accordingly, it is possible to ensure a sufficient period between a plurality of transmissions or receptions without requiring configurations or indications.

In addition, with respect to the terminal 20, the beam switching gap between signals or channels is defined based on the design of the physical layer. Accordingly, it is possible to ensure a sufficient period between a plurality of transmissions or receptions regardless of the requirements of the wireless devices.

According to a technique related to the above-described embodiments of the present invention, the flexible beam switching supporting the larger subcarrier spacing is enabled.

(Device Configuration)

Next, a functional configuration example of the base station 10 and the terminal 20 for performing the processes and operations described above will be described.

<Base Station 10>

Figure 5:
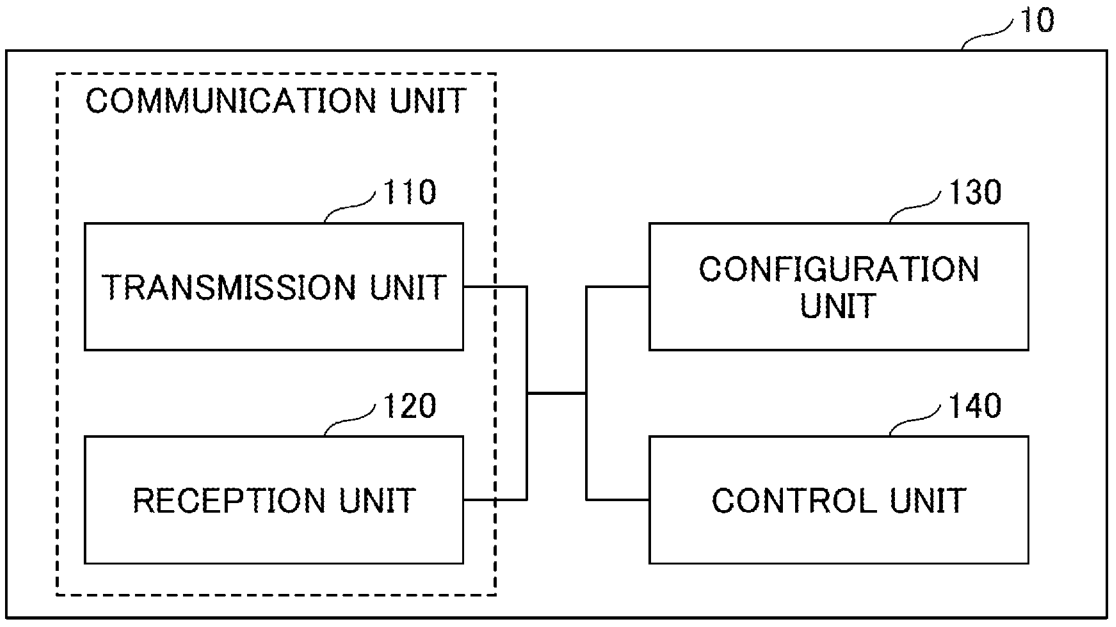
FIG. 5 is a drawing illustrating an example of a functional structure of a base station 10 in an embodiment of the present invention.

FIG. 5 is a diagram illustrating an example of a functional configuration of the base station 10. As shown in FIG. 5, the base station 10 includes a transmission unit 110, a reception unit 120, a configuration unit 130, and a control unit 140. The functional structure illustrated in FIG. 5 is merely an example. Functional divisions and names of functional units may be anything as long as operations according to an embodiment of the present invention can be performed. Further, the transmission unit 110 and the reception unit 120 may be combined and may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function to transmit NR-PSS. NR-SSS. NR-PBCH, DL/UL control signals, DCI via PDCCH, data via PDSCH, and the like, to the terminal 20.

The configuration unit 130 stores preset configuration information and various configuration information items to be transmitted to the terminal 20 in a storage device included in the setting unit 130 and reads the preset configuration information from the storage apparatus if necessary.

The control unit 140 performs scheduling of the terminal 20 for DL reception or UL transmission, via the transmission unit 110. In addition, the control unit 140 includes a function of performing LBT. The functional units related to signal transmission in the control unit 140 may be included in the transmission unit 110, and the functional units related to signal reception in the control unit 140 may be included in the reception unit 120. Further, the transmission unit 110 may be referred to as a transmitter, and the reception unit 120 may be referred to as a receiver.

<Terminal 20>

Figure 6:
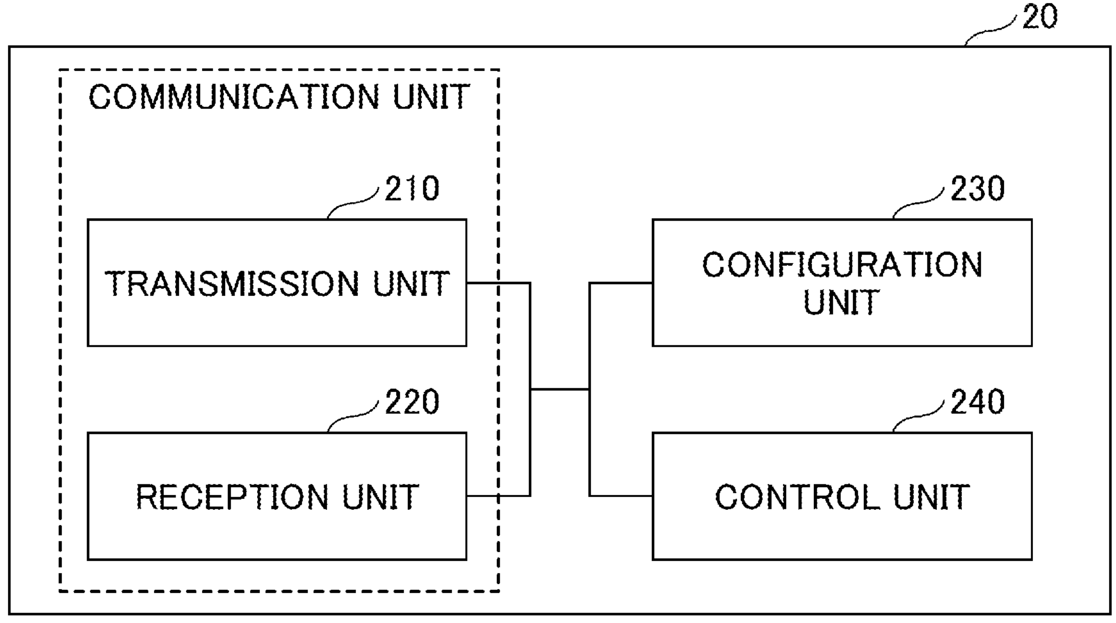
FIG. 6 is a drawing illustrating an example of a functional structure of a terminal 20 in an embodiment of the present invention.

FIG. 6 is a diagram illustrating an example of a functional configuration of the terminal 20. As shown in FIG. 6, the terminal 20 includes a transmission unit 210, a reception unit 220, a configuration unit 230, and a control unit 240. The functional structure illustrated in FIG. 6 is merely an example. Functional divisions and names of functional units may be anything as long as operations according to an embodiment of the present invention can be performed, the transmission unit 210 and the reception unit 220 may be combined and may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the reception unit 220 has a function of receiving NR-PSS, NR-SSS. NR-PBCH, DL/UL/SL control signals. DCI via PDCCH, data via PDSCH, etc., transmitted from the base station 10. In addition, for example, with respect to the D2D communications, the transmission unit 210 may transmit, to another terminal 20. PSCCH (Physical Sidelink Control Channel). PSSCH (Physical Sidelink Shared Channel), PSDCH (Physical Sidelink Discovery Channel). PSBCH (Physical Sidelink Broadcast Channel), etc., and the reception unit 120 may receive, from the another terminal 20, PSCCH, PSSCH, PSDCH, or PSBCH.

The configuration unit 230 stores various configuration information items received from the base station 10 or the another terminal by the reception unit 220 in the storage device included in the configuration unit 230, and reads them from the storage device as necessary. In addition, the configuration unit 230 also stores pre-configured configuration information. The control unit 240 controls the terminal 20. In addition, the control unit 240 includes a function of performing LBT.

The terminal and the base station in an embodiment of the present invention may be configured as the terminal and base station described below. In addition, a communication method below may be performed.

<Configuration Related to an Embodiment of the Present Invention>

(First Item)

A terminal includes: a control unit configured to assume a beam switching gap between a plurality of signals or channels for transmission and reception to be a sufficient time corresponding to a larger subcarrier spacing.

(Second Item)

In the terminal as described in the first item, the control unit assumes the beam switching gap between the plurality of signals or channels to be a predefined period.

(Third Item)

In the terminal as described in the second item, the control unit applies a same beam to the plurality of signals or channels in a case where the beam switching gap between the plurality of signals or channels is not sufficient.

(Fourth Item)

In the terminal as described in the second item, the control unit cancels one of the plurality of signals or channels in a case where the beam switching gap between the plurality of signals or channels is not sufficient.

(Fifth Item)

A base station includes: a control unit configured to assume a beam switching gap between a plurality of signals or channels for transmission and reception to be a sufficient time corresponding to a larger subcarrier spacing.

(Sixth Item)

In a communication method performed by a terminal, the communication method includes: assuming a beam switching gap between a plurality of signals or channels for transmission and reception to be a sufficient time corresponding to a larger subcarrier spacing.

According to any one of the above-described configurations, a technique is provided for enabling the flexible beam switching to support the larger subcarrier spacing. According to the second item, it is possible to ensure a sufficient period between a plurality of transmissions or receptions without requiring configurations or indications. According to the third item, it is possible to specify an operation in a case where the sufficient period cannot be ensured between a plurality of transmissions or receptions. According to the fourth item, it is possible to specify an operation in a case where the sufficient period cannot be ensured between a plurality of transmissions or receptions. According to the fifth item, a base station is provided for enabling the flexible beam switching to support the larger subcarrier spacing.

(Hardware Structure)

In the above functional structure diagrams used for describing an embodiment of the present invention (FIG. 5 and FIG. 6), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming, broadcasting, notifying, communicating, forwarding, configuring, reconfiguring, allocating, mapping, and assigning, etc. For example, a functional block (component) that functions to perform transmission is called a transmitting unit or a transmitter. In either case, as described above, the implementation method is not particularly limited.

Figure 7:
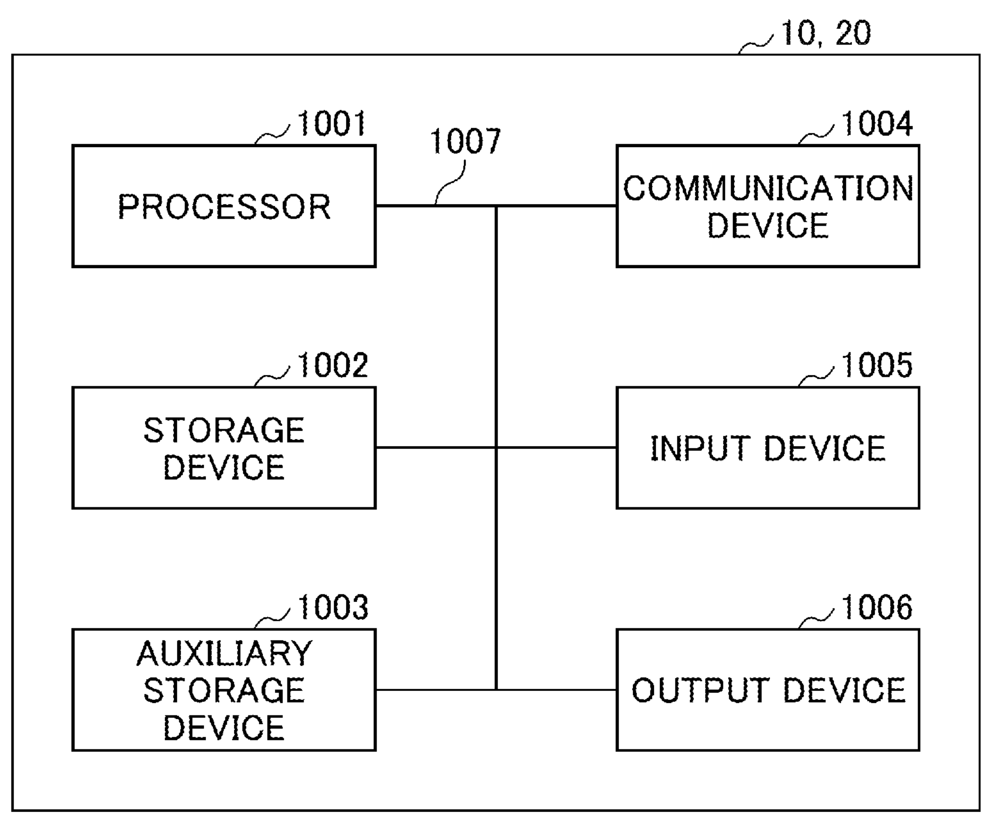
FIG. 7 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 7 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may not include some devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 5 may be realized by control programs that are stored in the storage device 1002 and are executed by the processor 1001. Further, for example, the control unit. 240 of the terminal 20 illustrated in FIG. 6 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at, least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or reception device) for communicating with computers via at least one of a wired network and a wireless network, and may be referred to as a network device, a network controller, a network card, a communication module, etc. The communication device 1004 may include a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and the terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI. UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least one of a system using UTE (Long Term Evolution). LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark). GSM (registered trademark), CDMA2000, UMB (Ultra Mobile Broadband), IEEE 802.11 (Wi-Fi (registered trademark)). IEEE 802.16 (WiMAX (registered trademark)), IEEE 802.20. UWB (Ultra-WideBand). Bluetooth (registered trademark), and other appropriate systems, and a next generation system enhanced therefrom. Further, multiple systems may also be applied in combination (e.g., at least one of UTE and UTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be implemented by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may represented by using any one of various different technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present, specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms "system" and "network" are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH. PDCCH) and information elements may be identified by any suitable names, the various names assigned to these various channels and information elements are not used as limitations.

In the present disclosure, the terms "BS: Base Station", "Radio Base Station", "Base Station", "Fixed Station", "NodeB", "eNodeB (eNB)", "gNodeB (gNB)", "Access Point", "Transmission Point", "Reception Point", "Transmission/Reception Point", "Cell", "Sector", "Cell Group", "Carrier", "Component Carrier", and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term "cell" or "sector" refers to a part or all of the coverage area of at least one of the base station and base station subsystem that provides communication services at the coverage.

In the present disclosure, terms such as "mobile station (MS)", "user terminal", "user equipment (UE)", "terminal", and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the terminal. For example, each aspect/embodiment of the present disclosure may be applied to a configuration in which communications between the base station and the terminal are replaced by communications between multiple terminals 20 (e.g., may be referred to as D2D (Device-to-Device). V2X (Vehicle-to-Everything), etc.). In this case, the function of the base station 10 described above may be provided by the terminal 20. Further, the phrases "up" and "down" may also be replaced by the phrases corresponding to terminal-to-terminal communication (e.g., "side"). For example, an uplink channel, a downlink channel, or the like, may be read as a sidelink channel.

Similarly, the terminal in the present disclosure may be read as the base station. In this case, the function of the terminal described above may be provided by the base station.

The term "determining" used in the present specification may include various actions or operations. The "determining" may include, for example, a case in which "judging", "calculating", "computing", "processing", "deriving", "investigating", "looking up", "search", "inquiry" (e.g., looking up a table, database, or other data structures), or "ascertaining" is deemed as "determining". Further, the "determining" may include a case in which "receiving" (e.g., receiving information). "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining". Further, "decision" may be read as "assuming", "expecting", or "considering", etc.

The term "connected" or "coupled" or any variation thereof means any direct or indirect connection or connection between two or more elements and may include the presence of one or more intermediate elements between the two elements "connected" or "coupled" with each other. The coupling or connection between the elements may be physical, logical, or a combination thereof. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description "based on" used in the present specification does not mean "based on only" unless otherwise specifically noted. In other words, the phrase "based on" means both "based on only" and "based on at least".

Any reference to an element using terms such as "first" or "second" as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

"Means" included in the configuration of each of the above apparatuses may be replaced by "parts", "circuits", "devices", etc.

In the case where the terms "include", "including" and variations thereof are used in the present disclosure, these terms are intended to be comprehensive in the same way as the term "comprising". Further, the term "or" used in the present specification is not intended to be an "exclusive or".

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or reception of a signal or channel. The numerology may indicate at least one of, for example. SubCarrier Spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain, such as OFDM (Orthogonal Frequency Division Multiplexing) symbols. SC-FDMA (Single Carrier Frequency Division Multiple Access) symbols, and the like. The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe. Further, a slot may be referred to as a unit time. The unit time may vary for each cell depending on the numerology.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Re. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), sub-carrier groups (SCCs), resource element groups (REGs), PRB pairs. RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL BWP) and BWP for DL (DL BWP). For a UE, one or more BWPs may be configured in one carrier.

At least one of the configured BWPs may be activated, and the UE may assume that the UE will not transmit and receive signals/channels outside the activated BWP. It should be noted that the terms “cell” and “carrier” in this disclosure may be replaced by “BWP.”

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, in a case where an article is added by translation, for example “a”, “an”, and “the”, the disclosure may include that the noun following these articles is plural.

In this disclosure, the term “A and B are different” may mean “A and B are different from each other.” It should be noted that the term “A and B are different” may mean “A and B are different from C.” Terms such as “separated” or “combined” may be interpreted in the same way as the above-described “different”.

An aspect/embodiment described in the present specification may be used independently, may be used in combination, or may be used by switching according to operations. Further, notification (transmission/reporting) of predetermined information (e.g., notification (transmission/reporting) of “X”) is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:

a transceiver that transmits or receives a plurality of signals; and a processor that compares a beam switching gap between the plurality of signals with a threshold value specified for each of subcarrier spacings, wherein, in response to determining, by the processor, that the beam switching gap between the plurality of signals is greater than the threshold value, the transceiver transmits or receives the plurality of signals by allowing beams different from each other, and wherein, in response to determining, by the processor, that the beam switching gap between the plurality of signals is less than or equal to the threshold value, the transceiver transmits or receives the plurality of signals using a same beam that is indicated by a last downlink control information format in time, from among downlink control information formats corresponding to the plurality of signals.

2. A base station comprising:

a transceiver that transmits or receives a plurality of signals; and a processor that compares a beam switching gap between the plurality of signals with a threshold value specified for each of subcarrier spacings, wherein, in response to determining, by the processor, that the beam switching gap between the plurality of signals is greater than the threshold value, the transceiver transmits or receives the plurality of signals by allowing beams different from each other, and wherein, in response to determining, by the processor, that the beam switching gap between the plurality of signals is less than or equal to the threshold value, the transceiver transmits or receives the plurality of signals using a same beam that is indicated by a last downlink control information format in time, from among downlink control information formats corresponding to the plurality of signals.

3. A communication method performed by a terminal, the communication method comprising:

comparing a beam switching gap between a plurality of signals with a threshold value specified for each of subcarrier spacings, wherein, in response to determining that the beam switching gap between the plurality of signals is greater than the threshold value, transmitting or receiving the plurality of signals by allowing beams different from each other, and wherein, in response to determining that the beam switching gap between the plurality of signals is less than or equal to the threshold value, transmitting or receiving the plurality of signals using a same beam that is indicated by a last downlink control information format in time, from among downlink control information formats corresponding to the plurality of signals.

* * * * *